Patented Sept. 26, 1933

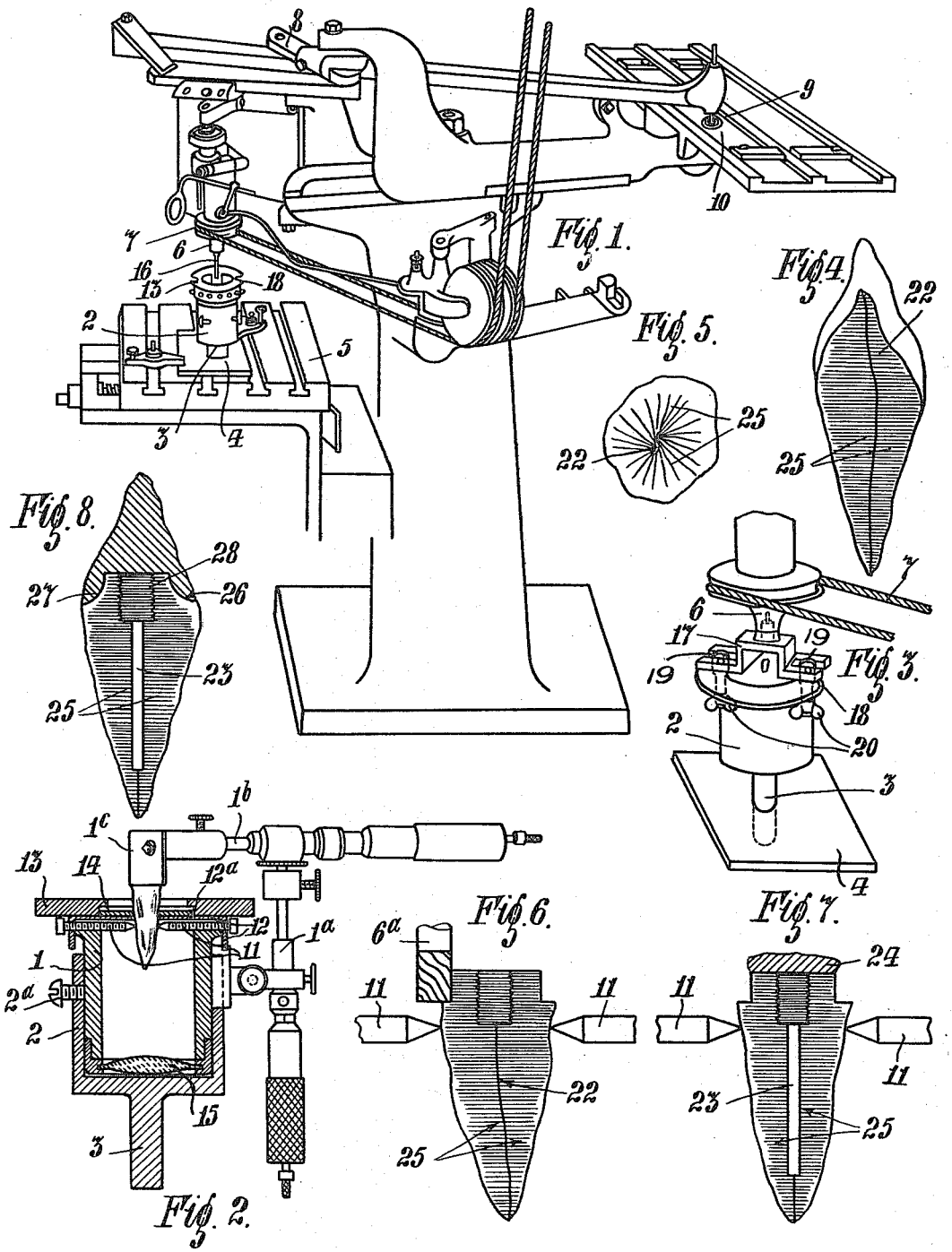

1,928,518

UNITED STATES PATENT OFFICE 1,928,518

DENTAL MACHINE

William Watson, Glasgow, Scotland

Application August 4, 1931, Serial No. 555,063, and in Great Britain November 18, 1931

8 Claims. (Cl. 32—5)

The object of the present invention is to provide a method whereby when a tooth is removed, the pores thereof can be rendered aseptic.

To this end, my method comprises the steps of first mounting the tooth in a rotatable support so that the tooth root is enclosed in an aseptic casing, then introducing a liquid antiseptic into the interior canal of the tooth root and afterwards rotating the support at a high speed so that the antiseptic is forced into the tubules or pores and structure of the tooth root by centrifugal force.

In carrying out the invention, I preferably use a machine which comprises the combination with an aseptic casing for enclosing the tooth root, of a rotatable mounting for supporting the tooth root, a drill or other device for cleaning or boring out the interior canal of the tooth root so as to receive a liquid antiseptic, and rotary driving means whereby the support and casing together with the tooth root are rotatable at high speed so that by centrifugal force the antiseptic is caused to permeate the pores and other parts of the tooth root throughout, thereby destroying all microbes.

In practice, the tooth root is supported in a clamping device so that it depends coaxially within the aseptic casing, and after the interior canal of the tooth root has been bored out and filled with the liquid antiseptic, the entrance to the canal is preferably closed by collodion or like material. Preferably, for the purpose of obtaining the desired centrifugal force I employ a transmitting clamp adapted to transmit rotary motion to the aseptic casing from the belt driven or like means normally used for rotating the boring drill or other element employed to clean out the interior canal of the tooth root. In order to steady the aseptic casing during the high speed rotation, a bearing is preferably provided at or near the bottom of the casing.

It is essential to the success of the replanting operation that the extracted tooth be replanted before the cells thereof are dead, and on that account the work involved in replanting the tooth must not only be performed with the tooth root out of contact with the air, but also must be effected rapidly. Thus, in accordance with a further feature of the invention a pantograph or equivalent means is employed whereby the upper part of the tooth root can be quickly and easily shaped so as to receive an artificial crown by means of a tool or cutter having its movement controlled by the pantograph or equivalent means, a stylus or indicator on the pantograph or equivalent means being guided along the boundary of a corresponding shape marked or otherwise arranged on a platen or the like supported in proximity to the stylus or indicator.

The invention will now be described, by way of example, with reference to the annexed drawing, in which:—

Fig. 1 is a perspective view of the machine;

Fig. 2 is an enlarged view of the aseptic casing showing the tooth and its mounting together with a measuring and positioning device, all the parts, with the exception of the measuring and positioning device, being shown in vertical cross section;

Fig. 3 is a fragmentary perspective view of part of the machine shown in Fig. 1, indicating the transmission of the drive to the aseptic casing for the centrifugal action.

Figs. 4 and 5 are respectively enlarged elevation and plan views of a tooth showing diagrammatically the outwardly radiating tubules or pores;

Fig. 6 is an enlarged vertical section of a tooth-root partially shaped to receive an artificial crown;

Fig. 7 is an enlarged vertical section of the same tooth-root ready for disinfecting by centrifugal action;

Fig. 8 is an enlarged vertical section of the completed tooth-root with the artificial crown in position.

Referring to the drawing,

The aseptic casing comprises an inner vessel 1 arranged in a substantially cup-shaped support 2 having at the bottom an integral bearing pin or pillar 3 which is rotatably mounted in a fixed plate 4. The plate 4 is clamped on a universally adjustable table 5 of a machine of known design embodying a tool chuck or holder 6 adapted to be rotated by a pulley and belt drive 7 and to be guided laterally by a pantograph 8. The stylus 9 of the pantograph is adapted to be moved over a representation of a tooth contour marked on a platen 10 so that in known manner the path traced by the stylus is reproduced in the same or different proportion by the movement of the tool holder 6.

The aseptic casing or vessel 1 is provided at the top with a ring of inwardly radiating screws 11 or other means whereby the tooth-root can be readily gripped and centred, and also comprises a rubber dam 12, a centrally apertured disc 13, and interchangeable washer 14 all as described in my prior Patent No. 1,325,426. As indicated in Fig. 2 the inner vessel 1 of the aseptic casing is closed at the bottom by a lens 15, the purpose of which is hereinafter described.

A small apertured rubber disc or auxiliary dam 12ª is arranged above the main dam. This auxiliary dam is arranged between the main dam 12 and washer 14, and is secured to the tooth by a small thread or other ligature, and ensures the complete air-tightness of the aseptic casing, even though the main dam does not press against the tooth-root with a uniform pressure all round.

As in my prior specification aforesaid, the inner vessel 1 is detachably fitted with a graduated post 1ª which is preferably constituted by the adjustable element of a micrometer and on which is adjustably mounted an arm 1ᵇ also constituted by the adjustable element of a micrometer and carrying a radially adjustable crown engaging device 1ᶜ, the use of which is explained hereinafter.

In the machine as illustrated in Figs. 1 and 2, the tool holder 6 is provided with a boring drill 16. This drill can be replaced by any other cutting tool required for treatment of the tooth, and can also be interchanged by a transmitting clamp 17 (see Fig. 3). This clamp has an upwardly projecting shank of similar form to that provided on the drill or other tools, and is adapted to be firmly secured to the upper end of the aseptic casing 1, which end is for this purpose provided with notches 18 adapted to be engaged by screws 19. The connection between the tool chuck or holder 6 and the aseptic casing 1 is made secure by tightening up the wing nuts 20.

The operation of replanting a tooth as regards the sawing off of the natural crown or other part, and the provision of a screw-threaded hole at the top of the sawed root is substantially the same as described in my prior specification aforesaid. For the accommodation of the artificial crown, however, the following operation is next carried out. A burr or milling cutter 6ª (see Fig. 6) is inserted into the tool chuck 6, and this, while rotating, is manipulated through the medium of the pantograph 8 so as to reduce the periphery of the upper part of the tooth-root in order to form a spigot 26, the stylus 9 of the pantograph being guided over a conforming shape marked or placed on the platen 10. The resulting tooth root is as shown in Fig. 6, being gripped a short distance from the top by the inwardly projecting screws 11 of the aseptic casing 1.

The method of disinfecting the prepared tooth root is then as follows:—

The interior canal 22 (Fig. 6) is first cleaned out by boring a hole 23 (Fig. 7) of narrow diameter down the greater part of the tooth root. This hole 23 is then completely filled by the aid of a pipette with a liquid antiseptic and the top of the hole closed by collodion 24 as shown diagrammatically in Fig. 7. In introducing the disinfectant into the hole 23, the open end of the pipette is lowered to the bottom of the hole, so that the air therein is displaced as the disinfectant is run in. Another drop or drops of disinfectant may be introduced when the first charge of disinfectant is partly absorbed in the structure of the tooth root.

The tooth root is now ready for the rapid rotation, and accordingly the top of the aseptic casing 1 is firmly secured by the transmitting clamp 17 to the tool chuck or holder 6. The belt and pulley drive 7 is then set in motion and the aseptic casing 1 with the clamped tooth root is thereby rapidly rotated. As a consequence, the liquid antiseptic in the vertical hole 23 is forced outwards by centrifugal action through all the radiating pores 25 of the tooth root and disinfects the whole tooth structure, with the result that all microbes contained in the pores or other parts are destroyed by the centrifugal antiseptic.

The antiseptic employed is generally a weak solution of carbolic acid, say about 2½% strength.

Thereafter, the rotation of the aseptic casing with the tooth root is stopped and the transmitting clamp 17 is disconnected from the tool chuck 6 and the casing 1.

The collodion 24 is now removed, the liquid antiseptic initially introduced into the hole 23 being of such amount that it is entirely absorbed in the pores and tooth structure. After this has been done, an artificial crown is secured by cement in position on the tooth root as shown in Fig. 8. This artificial crown is of such a structure as to be applicable to a tooth only when extracted and replaced in accordance with my invention. As will be seen from Fig. 8, the artificial crown may be made wholly or partly of porcelain and includes a depending collar 27 and pin 28. Finally, the tooth root with the artificial crown cemented thereon is replanted in the tooth socket in the patient's mouth.

It will be understood that by the use of a pantograph as mentioned above, the work of reducing the perimeter of the upper part of the tooth-root so as to provide a shank or spigot for the artificial crown is greatly facilitated. It may be said that, for the purpose of this invention, the human teeth can be grouped into a small number of groups for each of which one or other small number of shapes and sizes of crown may suffice, representations of the several shapes and sizes being capable of arrangement on the platen with which the pantograph is used. In general, one shape of crown (with one or two sizes of that shape) serves for the upper and lower bicuspids, another for the upper and lowere molars, another for the upper fronts, laterals and canines and for the lower canines, and a fourth for the lower centrals and laterals.

Thus, for any particular tooth, after the actual crown is sawn off, the upper part of the tooth is quickly reduced to suit the particular artificial crown to which the tooth extracted is considered to correspond.

In practice the dimensions and position of the natural crown of the tooth are taken by the micrometer device 1ª and 1ᶜ and this device, whilst being removed to enable the rotary or centrifuging action to be carried out, is replaced on the inner vessel of the aseptic casing after the artificial crown is fitted, so that the dimensions and position of this crown may be made to correspond exactly with the natural crown removed.

Before or after the cleaning of the central canal of the tooth or the centrifuging action, the inner vessel 1 may be removed from its support 2 by loosening the screw 2ª. The inner vessel 1 with the tooth therein can then be held up so that rays of light from a lamp or sunlight can be concentrated on the tooth by the lens 15, through which also the dentist or operative can view the tooth root.

By the aid of a machine as described, the whole operation of removing, disinfecting, crowning and replanting the tooth can be performed within a few minutes, during which the cells on the tooth root are protected against damage and kept from contact with foreign matter by means of the aseptic air-tight casing, and the means supporting the tooth touches the same only at the junction between the root and crown.

I claim:

1. In the operation of replanting teeth, a method of rendering the pores and structure of a tooth aseptic comprising the steps of mounting the tooth in a rotatable support so that the tooth root is enclosed in an aseptic casing, introducing a liquid antiseptic into the interior canal of the tooth, and revolving the support at high speed so that the antiseptic is forced into the pores and other parts of the tooth by the action of centrifugal force.

2. In the operation of replanting teeth, a method of rendering the pores and structure of the tooth aseptic comprising the steps of mounting the tooth root uprightly in a rotatable support so that the tooth root is enclosed in an aseptic casing, cleaning or boring out the interior canal of the tooth root, filling the said canal with a liquid antiseptic, closing the entrance to the said canal, and finally rotating the support and casing together with the tooth root at a high speed about a fixed axis so as to force the antiseptic into the pores and other parts of the tooth root by centrifugal action.

3. For use in the operation of replanting teeth, a machine having means whereby a tooth having the interior canal of its root cleaned out can have the pores and structure of the root rendered aseptic, comprising, in combination, an aseptic casing for enclosing the tooth root and supporting the tooth so as to receive liquid antiseptic into the interior canal thereof, and rotary driving means whereby said casing together with the tooth root is rotatable at high speed so as to force the antiseptic into the pores and other parts of the tooth by centrifugal action.

4. For use in the operation of replanting teeth, a machine having means whereby a tooth with the interior canal of its root cleaned out can have the pores and structures of the root rendered aseptic, comprising the combination with an aseptic casing of a bearing wherein said casing is rotatable, a clamping device provided at the top of said casing and adapted to support the tooth so that its root depends coaxially within said casing and is adapted to receive liquid antiseptic into the interior canal thereof, and means whereby after the entrance to said canal is closed the casing with the clamping device and tooth root is rotated at a high speed about its vertical axis so as to force the antiseptic into the pores and other parts of the tooth root by centrifugal action.

5. For use in the operation of replanting teeth, a machine comprising the combination with an aseptic casing for enclosing the tooth root and supporting the tooth so as to receive liquid antiseptic into the interior canal thereof, of a mounting for the said casing, a cutter, and a pantograph adapted to control the movement of said cutter, a platen having marked thereon the boundary of a shape corresponding to the crown of the said tooth, and a stylus on said pantograph adapted to be guided along said boundary so that the upper part of the tooth root can be quickly and easily shaped by said cutter so as to receive an artificial crown.

6. For use in the operation of replanting teeth, a machine having means whereby a tooth with the interior canal of its root cleaned out, can have the pores and structure of the root rendered aseptic, comprising, in combination, an aseptic casing for enclosing the tooth root and supporting the tooth so as to receive into the interior canal of its root a liquid antiseptic, rotary driving means, and a transmitting clamp adapted to connect said rotary driving means with said casing whereby said casing with said root is rotatable at high speed so as to force the antiseptic into the pores and other parts of the tooth by centrifugal action.

7. A machine, as claimed in claim 6, comprising a rotatable support for the aseptic casing and a bearing for said support so as to steady it during high speed rotation.

8. A method, as claimed in claim 1; comprising the step of reducing the upper part of the tooth root prior to disinfecting so as to provide a spigot for the reception of an artificial crown having a central pin and surrounding collar.

WILLIAM WATSON.